Aug. 17, 1965

A. PFEIFER 3,200,673

TOOL FOR FINE CUTTING

Filed May 22, 1964

2 Sheets-Sheet 1

INVENTOR

Alfred Pfeifer

BY Bailey, Stephens and Huettig

ATTORNEYS 3,200,673
TOOL FOR FINE CUTTING
Alfred Pfeifer, Frankfurt am Main, Germany, assignor to Deutsche Gold- und Silber-Scheideanstalt vormals Roessler, Frankfurt am Main, Germany
Filed May 22, 1964, Ser. No. 369,460
Claims priority, application Germany, June 21, 1963, D 41,807
3 Claims. (Cl. 77—58)

This invention relates to a tool for the fine drilling or cutting of a workpiece, such as a cylinder or a bushing. The purpose of the tool is to avoid scoring or marring the surface of the workpiece when the tool is withdrawn from the workpiece.

Tools have been used for the fine cutting of cylinders and bushings in which the cutting tool is located as far as possible inside the tool head attached to the rotating spindle. Special means are used to withdraw the cutting tool from the workpiece when the rotation of the spindle is stopped.

Such a tool, for example, is one in which a mechanism is used to stop the rotation of the spindle and the cutting tool always at the same point. Then the workpiece and/or the work table carrying the workpiece is displaced to separate the workpiece from the cutting tool.

In another fine cutting tool, the longitudinal center axis of the work spindle is offset a few degrees from its position maintained during the cutting step by means of a mechanism in the lower portion of the spindle. Thus, after the cutting is stopped, the cutting tool is removed from the workpiece.

These known cutting tools have the disadvantage in that they are relatively complicated and thus more subject to breakdowns during operation.

The object of this invention is to produce a fine cutting tool which avoids the disadvantages of the heretofore known tools. According to this invention, the spindle has a tool head in which are mounted one or more cutting tool carrying arms. Each arm is pivotally mounted on an axis offset from and parallel to the longitudinal center axis of the tool head. Stop lug means engaging an adjustable cam ring are mounted below the tool arms in such a way that the tool arms are forced by centrifugal force against the stop lugs as the spindle is rotated. Return springs are provided adjacent the cutting tools for pulling in the cutting tools away from the workpiece when the rotation of the head is stopped. These return springs extend from a point on a tool arm adjacent the cutting tool inside the tool head to adjacent the pivotal mounting for another tool arm.

Figure 1:
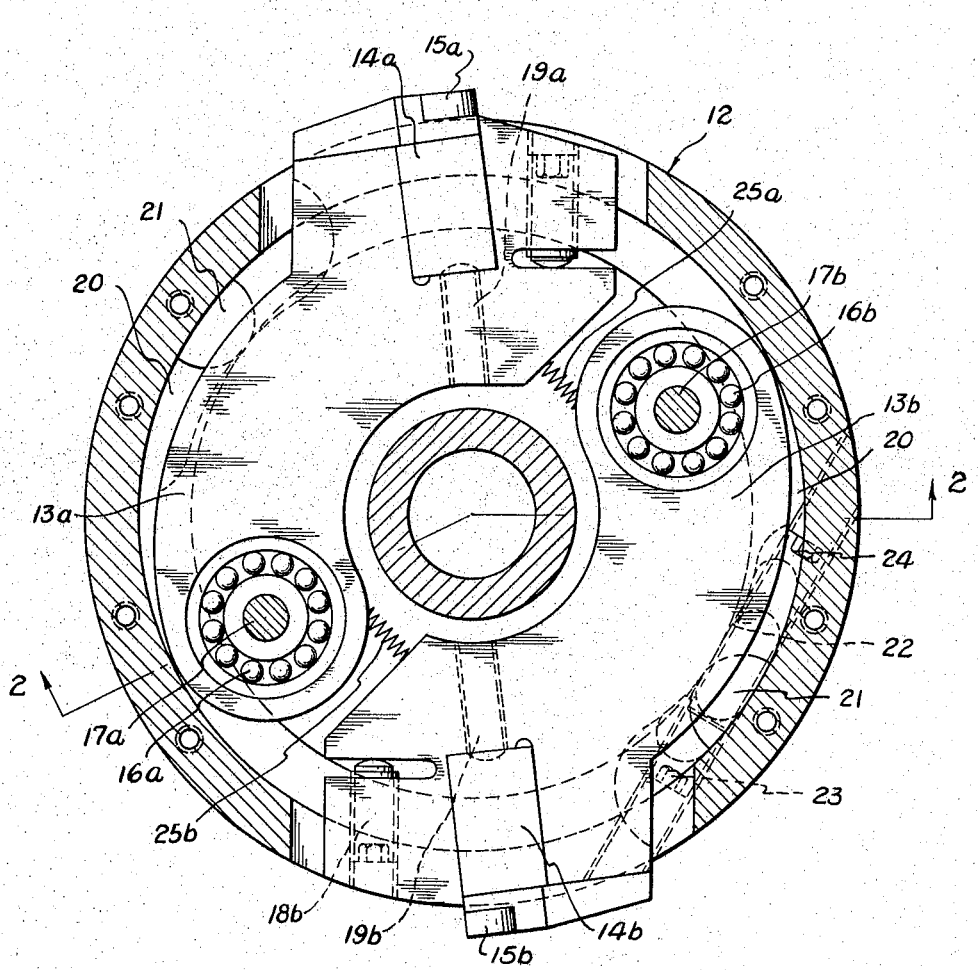
Figure 2:
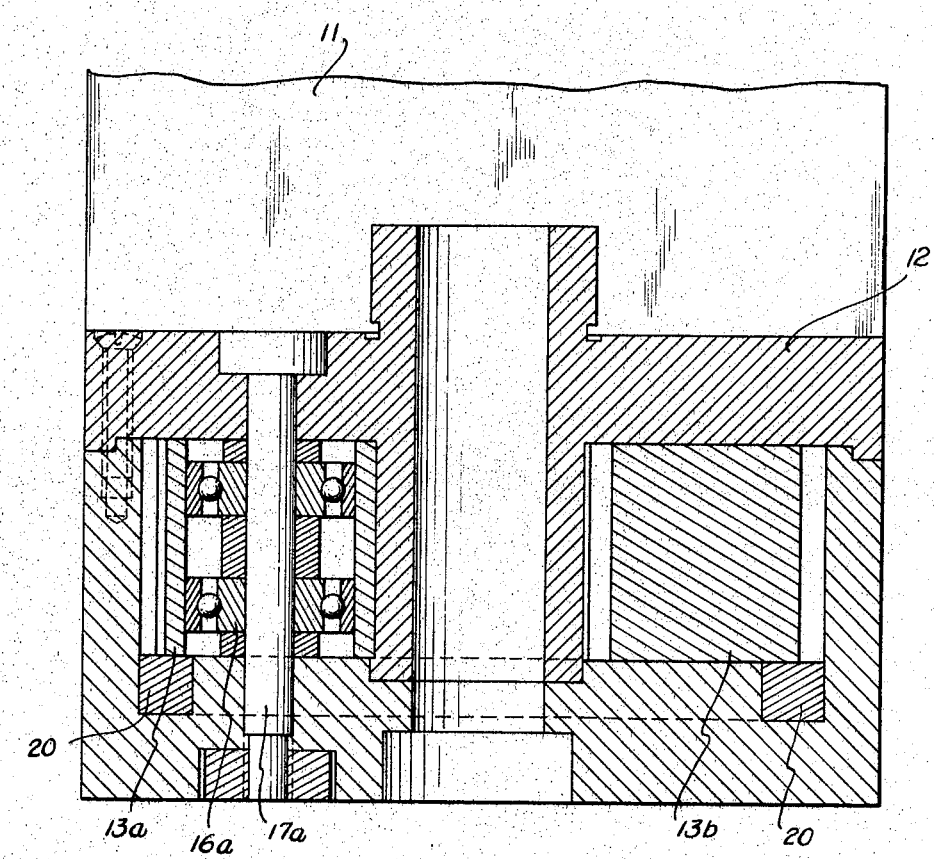

The means by which the objects of the invention are obtained are described more fully with reference to the accompanying drawings in which:

FIGURE 1 is a horizontal cross-sectional view through the tool head of this invention; and FIGURE 2 is a cross-sectional view taken on the line 2—2 of FIGURE 1.

As shown in FIGURE 2, the rotatable spindle 11 is secured to a tool head 12. Pivotally mounted within the tool head, note FIGURE 1, are a pair of similar tool carrier arms 13a and 13b. In the free end of each arm is a recess 14a and 14b, respectively, in which are secured the cutting tools 15a and 15b. Each arm is pivotally mounted by anti-friction roller bearings 16a and 16b around the shafts 17a and 17b, respectively, each of which is offset from and parallel to the center longitudinal axis of the tool head 12. Each cutting tool 15a and 15b is tightly held in the tool arm by means of the screws 18a and 18b, respectively.

Screws 19a and 19b set in the tool arms are used for the rough adjustment of the cutting edges 15a and 15b. The fine adjustment of the cutting edges is made by means of the adjustable ring cam 20 which carries the stop lugs 21 which ride in cam grooves in arms 13a and 13b. Adjustment is made by means of a lug 22 on ring 20 which is engaged by the adjusting screws 23 and 24. Lug 22 moves in an appropriate slot in head 12. Each tool arm is attached to a return spring 25a and 25b, respectively. Either straight or reversible cutting tools can be carried by the tool arms. One or more tool arms can be mounted in the tool head. As shown in the drawings, the return spring for each tool arm extends between the free end of one arm to the pivotal mounting portion of the other arm. If only one tool arm is used, then the return spring extends from the free end of the tool arm to another suitable position within the tool head.

In operation, each tool arm is pivotally mounted within the tool head and offset from the center of the tool head. When the tool head rotates, the cutting edge of each cutting tool moves to a circle having the diameter of the bore being cut. The tool edge is adjusted to the desired diameter by being forced by centrifugal force against its respective stop lug 21 of the fine adjustment and this diameter can be precisely controlled by means of both the rough adjustment and the fine adjustment. When the rotation of the tool head is stopped, the cutting tool is withdrawn from the workpiece by means of its respective return spring. When the tool head is rotated, each tool arm is forced against its fine adjustment stop lug by centrifugal force and the cutting edge of each cutting tool is in working position. The speed of rotation thus produces centrifugal forces which ensure a firm engagement of the tool arm with its fine adjustment stop lug. When rotation is stopped, the tool arm is withdrawn toward the interior of the tool head by the return spring whose force is substantially smaller than that of the centrifugal forces produced during rotation. The cutting edge is therefore withdrawn and disengaged from the workpiece. This process is automatically repeated during renewed starting and stopping of the machine. The automatic withdrawing of the cutting edges from the workpiece avoids the formation of score lines or other tool marks on the workpiece when the tool is withdrawn. Also, this device protects the cutting edge from breaking which is of especial importance when using very brittle material.

Having now described the means by which the objects of the invention are obtained, I claim:

1. A tool for the fine cutting of a workpiece such as a cylinder or bushing comprising a cylindrical tool head adapted to be attached to a spindle, a tool arm pivotally mounted in said tool head on an axis offset from and parallel to the longitudinal axis of said tool head, a cutting tool secured to said arm and extending outwardly of said tool head, means for the rough setting of said cutting tool, adjustable ring cam means for the fine adjustment of said cutting tool with respect to its outward movement due to the centrifugal force produced by the rotation of the tool head, and return spring means secured to said tool arm for withdrawing the cutting tool from a workpiece when the tool head is stopped.

2. A tool as in claim 1, further comprising anti-friction roller bearing means for pivotally mounting said arm in said tool head.

3. A tool as in claim 2, further comprising a pair of tool arms, and said spring means extending for one arm to a point adjacent the pivotal mounting of the other arm.

No references cited.

WILLIAM W. DYER, Jr., *Primary Examiner.*